United States Patent
Storey et al.

(10) Patent No.: US 7,958,276 B2
(45) Date of Patent: Jun. 7, 2011

(54) AUTOMATIC CONFIGURATION OF PERIPHERAL DEVICES

(75) Inventors: Duane T. Storey, Vancouver (CA); Jason Fischl, San Francisco, CA (US)

(73) Assignee: CounterPath Corporation, Vancouver, BC ( * ) Notice: Subject to any disclaimer, the term of this patent is extended or adjusted under 35 U.S.C. 154(b) by 0 days.

(21) Appl. No.: 11/656,887

(22) Filed: Jan. 22, 2007

(65) Prior Publication Data

US 2008/0177904 A1 Jul. 24, 2008

(51) Int. Cl.
G06F 3/00 (2006.01)
G06F 12/00 (2006.01)
(52) U.S. Cl. .............................. 710/8; 711/170
(58) Field of Classification Search ............. 710/8
See application file for complete search history.

(56) References Cited

U.S. PATENT DOCUMENTS

| | | | | |
|---|---|---|---|---|
| 5,428,748 A | * | 6/1995 | Davidson et al. | 710/9 |
| 5,487,168 A | * | 1/1996 | Geiner et al. | 705/8 |
| 7,240,106 B2 | * | 7/2007 | Cochran et al. | 709/222 |
| 2005/0114474 A1 | | 5/2005 | Anderson et al. | |
| 2005/0122911 A1 | | 6/2005 | Beichter et al. | |
| 2006/0050681 A1 | | 3/2006 | Monteiro et al. | |
| 2006/0136794 A1 | | 6/2006 | Lu et al. | |
| 2006/0173979 A1 | | 8/2006 | Roellgen | |

* cited by examiner

*Primary Examiner* — Henry W Tsai
*Assistant Examiner* — Juanito C Borromeo
(74) *Attorney, Agent, or Firm* — Lumen Patent Firm

(57) ABSTRACT

A method for automatically configuring peripheral devices performs a device assessment resulting in a list of available peripheral devices currently connected to the computer, calculates a configuration setting value from the list, and compares the configuration setting value to other values in a settings repository. If there is a match, then a prior selection of the peripheral devices is automatically restored. If there is no match, then devices are automatically selected from among the available peripheral devices in accordance with a predetermined devices database. The devices database includes possible devices and corresponding priority ranks for the possible devices. In addition, the computed configuration setting value is saved together with a current device selection in the settings repository.

19 Claims, 6 Drawing Sheets

AUTOMATIC CONFIGURATION OF PERIPHERAL DEVICES

FIELD OF THE INVENTION

The present invention relates generally to techniques for configuring peripheral devices connected to computing devices. More specifically, it relates to methods for automatic peripheral device configuration.

BACKGROUND OF THE INVENTION

Computing devices such as desktop computers, laptop computers, personal data assistants (PDAs), cell phones, IP phones, and media players are often able to operate with a variety of different peripheral devices. These peripheral devices might include, for example, internal speakers, microphones, and displays as well as many options for compatible external peripheral devices, such as external speakers, microphones, headsets, and displays. With such a great number of options, however, comes an associated need to configure the devices and update the configuration when devices are disconnected or connected and/or when the application software using the devices changes.

Various techniques are known to facilitate configuration of computer devices of various kinds. The reader is referred to the following publications, which are hereby incorporated by reference: US Patent Application Publication 20060173979 discloses a method for configuration of devices in a computer network by a computer program. US Patent Application Publication 20060136794 discloses a computer peripheral connecting interface system configuration debugging method and system. US Patent Application Publication 20060050681 discloses a method for the automatic configuration of an IP telephony device and/or data, system and device implementing same. US Patent Application Publication 20050122911 discloses a method for facilitating the configuring of communications environments, and a mapping tool therefore. US Patent Application Publication 20050114474 discloses a method for automatic configuration of network devices via connection to specific switch ports.

Despite these existing techniques, current methods for the configuration of peripheral devices connected to a computer require user intervention whenever a new device is connected to the computer, an existing device is disconnected from the computer, or a software application using particular devices is changed.

SUMMARY OF THE INVENTION

According to one aspect, the present invention provides a computer-implemented method for configuring peripheral devices used with software running on a computer. The method includes performing a device assessment resulting in a list of available peripheral devices currently connected to the computer. Preferably, the list is sorted according to predetermined criteria (e.g., alphabetically by device type and/or device name). A configuration setting value (e.g., MD5 hash) representing the current configuration is then computed from the list of peripheral devices. Preferably, the configuration setting value is a numeric or alphanumeric string that uniquely represents one configuration setting of the peripheral devices connected to the system. It is not necessary, however, that the value be absolutely unique; it is sufficient for practical purposes that the probability be extremely low (i.e., less than one in a million) that two different system configuration settings are represented by the same computed unique value. Thus, in the context of the present description a "unique" value is defined to include both absolutely unique values and values that are unique for all practical purposes, as defined above. If the computed configuration setting value exists in a settings repository, then a prior selection of the peripheral devices is automatically restored, making use of a device selection in the settings repository corresponding to the computed configuration setting value. The settings repository preferably contains a list of prior computed configuration setting values and corresponding prior device selections. If, on the other hand, the computed configuration setting value does not exist in the settings repository, then devices are automatically selected from among the available peripheral devices in accordance with a predetermined devices database. The devices database includes possible devices and corresponding priority ranks for the possible devices. In addition, the computed configuration setting value is saved together with a current device selection in the settings repository.

The method is preferably performed automatically when the software is started as well as while the software is running (e.g., when a peripheral device change is detected). Preferably, the method also includes the option of changing the current device selection in accordance with a manual user instruction, and saving the computed configuration setting value together with the current device selection in the settings repository. A subset of configurations may be disabled for selection when devices in the subset are not currently available on the computer. The automatic configuration of devices may include prioritizing devices in accordance with stored user preferences and/or in accordance with the software application. In some embodiments, the devices database is stored in a remote location and may be transmitted in whole or in part to the computer at appropriate times.

In a preferred implementation, the software is voice and video over IP (VVoIP) software and the peripheral devices comprise audio devices and video devices. The automatic configuration of the available devices in these cases typically includes selecting a headset device, a speaker-phone device, and a ring device. In addition, the devices database in these cases typically includes a headset database, a speaker-phone database, and an exclusion database. The exclusion database contains devices unsuitable for use with the software. The headset database contains a list of devices suitable for use as a headset device, ordered by expected desirability of using the devices with the software. The speaker-phone database contains a list of devices suitable for use as a speaker-phone device, ordered by expected desirability of using the devices with the software.

In VVoIP embodiments, the method employs three customized databases to perform the automatic configuration. These databases are used to configure the headset device, the speaker-phone device and the ring device. Within these databases is a list of case-sensitive device names or substrings along with an implicit priority. There is also another database that represents devices that should never be used as audio devices. For example, on a machine with a Plantronics Headset or a Logitech Camera, the database indicates to the algorithm that the Plantronics Headset is a headset, and the Logitech Camera is not a headset. On a system with a Plantronics Headset and a USB Headset, the database indicates both are headsets, but that the Plantronics Headset most likely sounds better (since it represents a more expensive device), and should be used instead of the generic USB headset.

DETAILED DESCRIPTION

Figure 6:
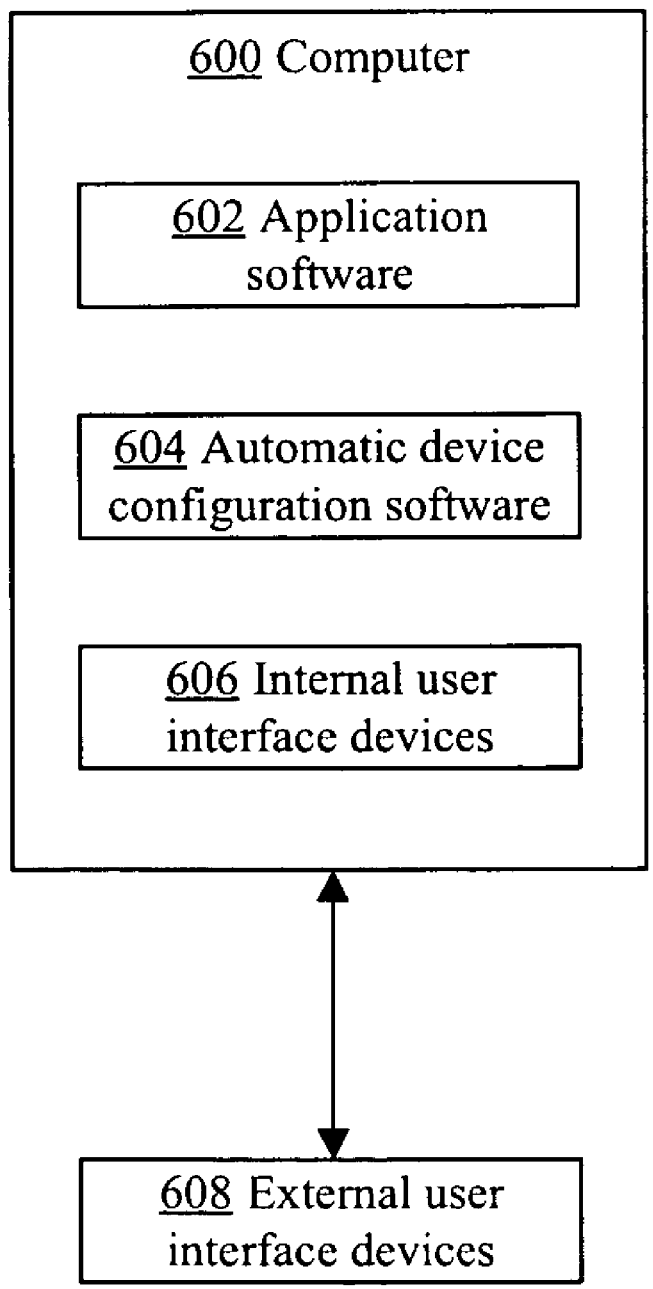
FIG. 6 is a schematic diagram of a computer that implements an automatic peripheral device configuration method of the present invention.

A block diagram of a computer implementing an embodiment of the present invention is shown in FIG. 6. A computer 600 executes application software 602 and automatic device configuration software 604. Computer 600 includes internal peripheral devices 606 and is connected to external peripheral devices 608. In the present context, the term "computer" is used to refer to any desktop, laptop, portable, hand-held, or embedded computing device that users may interact with via built-in or external peripheral devices. Examples include personal computers, set-top boxes, cellular telephones, personal data assistants (PDAs), IP telephones, and portable media players. The term "peripheral device" in the present context refers to a device whose primary function is to permit a human user to interact with the computer. Peripheral devices may be permanently or temporarily connected to the computer, or may be internal components of the computer or external devices connected to the computer by wired or wireless connections. Examples include video display screens, video cameras, speakers, headsets, and microphones. The term "software" in the present context refers to computer program instructions executed by the computer, including programs stored in read-only memory, flash memory, random access memory, or a computer readable storage medium.

In a preferred embodiment of the invention, the application software 602 is a voice and video over IP (VVoIP) application and the automatic peripheral device configuration software implements a method for automatically configuring with minimal user-interaction audio and video devices used by the VVoIP application software. The use of internet communication software such as VVoIP applications typically involves different peripheral device configurations for different users. Using conventional methods, each user needs to determine which audio device to use for audio capture and playback, and which camera capture device to use for video communications. Typically, configuring these two parameters involves a user-interaction step where the user manually determines which devices to use. Unfortunately, this interactive step is non-intuitive, and users can potentially select the wrong device, leading to problems such as one-way audio during an audio-call, or sub-optimal video. The automatic peripheral device configuration software 604 overcomes these problems.

Implementations of the present invention preferably make use of the concept of device class. A device class is a category of peripheral devices that have a common generic use or function. For example, in a voice over IP application, there might exist multiple device classes such as Input Audio Devices (microphones), Output Audio Devices (speakers), Output Video Devices (multiple screens), Input Video Devices (web camera, camcorder, digital camera), and Output Ring Devices. Within each of these classes can exist one or more specific devices. The purpose of the automatic configuration framework is to determine the appropriate device to use in the software application for each device class with minimal user interaction.

Figure 1:
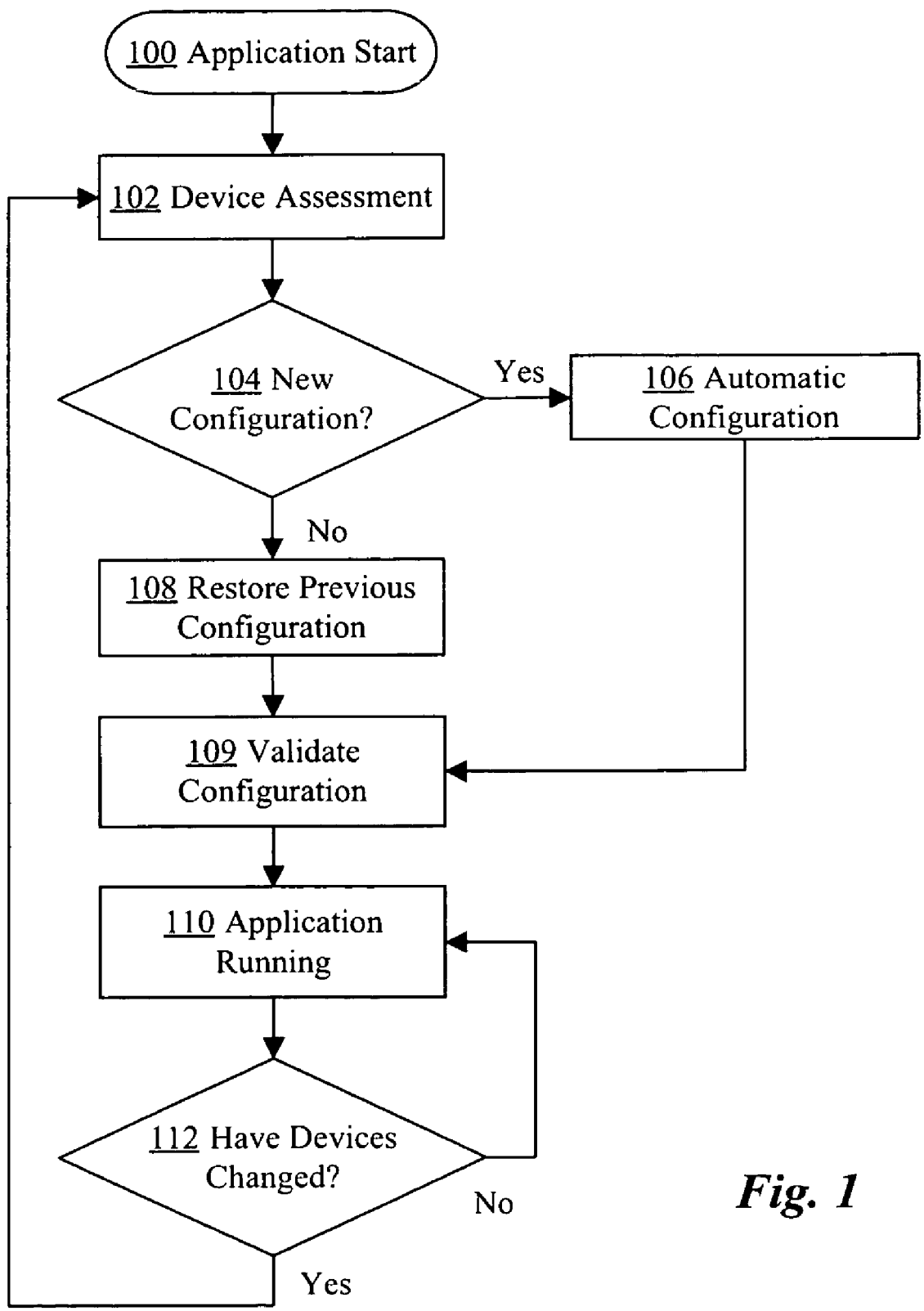
FIG. 1 is a flowchart illustrating how the method of automatic user device configuration is integrated into a software application, according to an embodiment of the invention.

FIG. 1 is a flowchart illustrating how the method of automatic user device configuration is integrated into a software application, according to an embodiment of the invention. After the VVoIP application starts at step 100, the automatic peripheral device configuration software automatically performs a system device assessment in step 102. This device assessment determines the current state of the peripheral devices that are currently connected to the computer and enabled/operational. A list of current peripheral devices is obtained from the operating system running on the computer. This list is then ordered and arranged according to whether the device is an input (i.e., a microphone in the case of audio, or a web cam in the case of video) or an output (i.e., speaker). The ordering is important so that the device list will generate a configuration setting value independent of the order in which the device names are acquired or returned from the operating system. Next, a configuration setting value is computed using the device names in these sorted lists to obtain a configuration setting numerical value that represents the current state of the system. The current device configuration state of the system is represented by this configuration setting value.

In step 104, this current configuration setting value is compared with configuration setting values in a settings repository that stores peripheral device configuration information and associated configuration setting values. If the current configuration setting value does not match a value presently existing in the settings repository, it is assumed that the peripheral device configuration is in a new state (either because this is the first time the application has been executed or because a device has been added to or removed from the system). In this case, an automatic configuration of the devices is performed in step 106. Otherwise, in step 108, a previous device configuration is restored using the matching device configuration information stored in the settings repository. In either case, after device configuration, the configuration is validated in step 109, and the software application runs, as shown in step 110. In a preferred embodiment, the method checks for a change in peripheral devices (e.g., whether a new device is connected or existing device is disconnected) in step 112. If a change is detected, then another device assessment is performed in step 102, and the devices are configured, as before. If, on the other hand, no change is detected, then the application continues running in step 110.

The configuration validation step 109 determines whether or not the selected devices are appropriate (for example, that an audio device is actually recording real sound on the microphone input, or that a video device is recording more than static or black frames). Several methods may be employed in this step, depending on the particular peripheral devices in the configuration. For example, to validate a microphone device, the audio is sampled from the microphone to determine whether or not voice is detected using a voice activity detection system. If voice is not detected after a pre-determined timeout (for example 10 seconds), the user is informed that no voice is detected on the audio device input. At this point the user may reconfigure the audio devices manually, or physically check if a microphone or other input device is connected to the audio device. For video input, the content of the video frames can be analyzed to determine if the input is valid. For example, if the frames are nearly all black (as indicated by low luminance values for each pixel), or if the distribution of luminance pixel values is flat (as in random noise) and varying (static), the user is informed that there is a problem with the video input. At this point, the user may reconfigure the video device, or physically check the input on the video device.

In a preferred embodiment, the device configuration resulting from the automatic configuration procedure described above can be changed by the user, if desired. In this case, the new user-selected configuration information and associated configuration setting value is stored in the local settings repository. Consequently, when this system state is encountered at a later time, the user-selected configuration associated with the configuration setting value will be recognized in the repository and the associated configuration set active.

Preferably, automatic configuration is performed "on-the-fly" as needed, e.g., whenever a device is added/removed/changed. When such a device change is detected, the auto-configuration algorithm attempts to reconfigure the devices in the background during the application run, and does not require an application restart. This reconfiguration can even take place during an active session (e.g., during a call in the context of a voice over IP application). Thus, the automatic configuration can deactivate a device currently in use and activate a new device during the call based on the results of the automatic configuration.

The automatic configuration will occur whenever the state of the devices accessible to the software changes. This is usually the result of the user manually connecting or disconnecting a USB or Bluetooth device, but could also happen by roaming into a new area where new devices are now accessible, or old devices become inaccessible. The automatic configuration framework does not differentiate between the system device state changing during startup or if it changes "on-the-fly" (i.e. while the application is running). In both scenarios, the automatic configuration will occur, restoring old devices if a previous configuration has selected all the devices, or choosing new devices if the configuration has never been encountered. In the context of a voice over IP application, if an automatic configuration occurs during a call, it is possible for the automatic configuration to deactivate the device currently in use and then reactivate a new device during the call based on the results of the auto-configuration.

The details of automatic configuration step 106 will now be described in more detail. The automatic configuration in this case chooses active devices for a headset device, a speaker-phone device, and a ring device. The configuration process uses pre-configured databases of device names, ordered according to their likelihood of being used in each of the above profiles.

The devices database may be stored locally, such as in firmware or a local media storage device, and/or in a remote location, such as on a networked server or media storage device. A local copy of a remote database may be updated by a third party (for example, the carrier in a voice over IP network might update it in response to new devices becoming available). This update can occur at any time. If an application is running, the new configuration can be pushed to active clients, or upon the next application run, the updated database can be retrieved and used for future device configurations.

In the VVoIP implementation, three databases are used during the configuration process, each of which will now be described.

A headset database contains an ordered set of strings or substrings that can be used to identify which devices on the computer can be used as a headset device. The ordering is based on the perceived sound quality that the device is capable of producing, as well as the likelihood of the device being used as a headset. For example, if USB Headset #1 is known to produce better sound quality than USB Headset #2, it will be ranked higher (by default) than USB Headset #2 within the database. If desired, the user can over-ride these rankings. On a machine where both USB Headset #1 and USB Headset #2 exist, the algorithm will use the priority ranking within the database to select USB Headset #1 over USB Headset #2. Another example is a system where there is a default, on-board sound card and an external Bluetooth headset. Since the default sound card exists on all machines, but the Bluetooth headset was purchased separately, the Bluetooth headset will be ranked higher (based on the assumption that, because the user had to go out and purchase the Bluetooth headset separately, it is more likely that the user actually wants to use it). In this scenario, the Bluetooth headset will be chosen by default over the built-in sound card. Again, the user can manually over-ride these rankings, if desired.

A speaker-phone database contains an ordered set of strings or substrings that can be used to identify which devices on the computer can be used as a speaker-phone device. The ordering is based on the perceived sound quality that the device is capable of producing, as well as the likelihood of the device being used as a speaker-phone. For example, on systems with built-in on-board sound cards, as well as an external USB web cam with a microphone, it is more likely that the USB web cam will be used in the speaker-phone configuration, since most users do not have any recording device connected to the on-board sound card, whereas the USB web cam has a microphone which can always be used. In this scenario, the USB web cam will be chosen by default over the on-board sound card.

The exclusion database includes a list of devices unsuitable for use with particular software applications. These devices are excluded from the automatic configuration algorithm when they exist on a users' machine. For example, in a VVoIP application, the exclusion database determines which devices are unacceptable for voice and video over IP calls. To provide another example, on computers running Microsoft Windows, a device called "Default Wave In" exists, but is not ideal to use since the user does not know what it is, and it can change at anytime. So the exclusion list includes that device name to ensure that it is never chosen. Another example is a device called "Total Recorder" which intercepts the audio data and records it. This type of device is not useful in a real-time voice over IP call.

Figure 2:
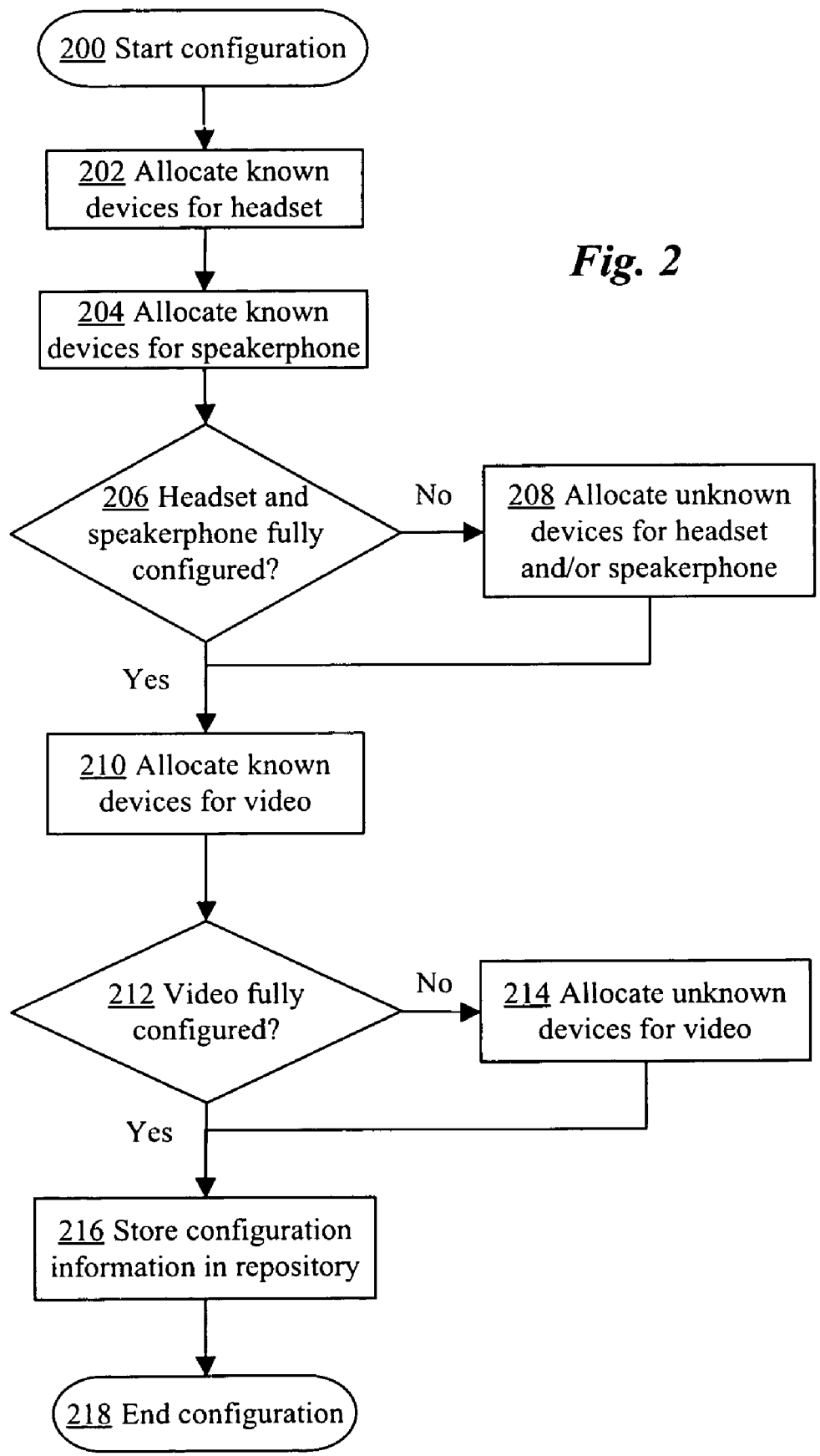
FIG. 2 is a flowchart illustrating details of an automatic user device configuration method adapted to a VVoIP software application, according to an embodiment of the invention.

FIG. 2 shows a flowchart of an automatic user device configuration method as adapted for use with a VVoIP software application. After the configuration routine starts at step 200, the active headset devices are chosen by using the associated headset device database in step 202. Next, in step 204, the active speaker-phone devices are chosen by using the associated speaker-phone device database. Step 206 checks if these configuration steps resulted in a complete profile (i.e., both the headset and speaker-phone devices are configured). If not, step 208 assigns audio and/or video devices that exist on the computer, but are not in one of the associated databases. In step 210, a video device is chosen using the associated video device database. Step 212 checks if a video device is chosen from the video device database. If not, one of the unknown devices is assigned in step 214. Once active devices have been automatically configured, information about this configuration is saved in the settings repository and associated with the current system state represented by the configuration setting value, as shown in step 218. The configuration ends in step 218.

Embodiments of the invention may include capabilities for the user to customize and control the automatic configuration procedure. For example, in one embodiment the user can adjust or alter an active configuration by either indicating that a particular device in a particular device class should always be used, or that the particular device should never be used. These local user preferences override the built-in database, or a database accessed remotely. Embodiments may also allow the user to override certain aspects of a remotely accessed database. For example, a user can set a local override for a particular device to prevent it from ever being selected during an automatic configuration. In this scenario, the local database always overrides information from the remotely accessed database.

Embodiments may also include a technique for ranking/prioritizing devices in the database. The ranking method may vary according to the software application. In the context of a voice over IP application, the ranking could list devices in order of perceived sound quality. In this type of ordering, the best sounding device will be ranked higher and thus preferentially selected over other devices as long as it exists in the database and there is no user preference that overrides the selection of the device. If a certain device configuration does not exist (for example, there are no suitable speaker-phone devices on the system), this type of device profile is disabled in the application (i.e. the speaker-phone button will be grayed out on the application).

As those skilled in the art will appreciate, the techniques of the present invention are not limited to use with desktop computers, but may be implemented on various types of computers. Any computing device that requires interaction from a user (either in the form of user-input or software-output to the user), can utilize this framework for automatically configuring these devices. For example, on a mobile phone, a user may have access to several audio devices via a Bluetooth connection. This framework can be used to automatically select the appropriate Bluetooth audio device to use based on preferences stored in a local or remote database. This framework can apply for any software-based device where the system configuration concerning the devices used for human interaction can change either between application runs, or during the application run.

The methods of the invention may be used with various kinds of software applications as well as various types of input/output devices that might be used with each one. For example, it may be used with cell phone firmware and interface devices to automatically determine peripheral devices such as Bluetooth devices and wired headsets. If a cell phone discovers multiple Bluetooth devices are available to it for use as audio devices, it can use the configuration framework to determine the appropriate device to use. If a cell phone or PDA supports external video devices, the automatic configuration framework would automatically switch to the external video device when it came in range, and if it was weighted higher in the database.

Figure 3:
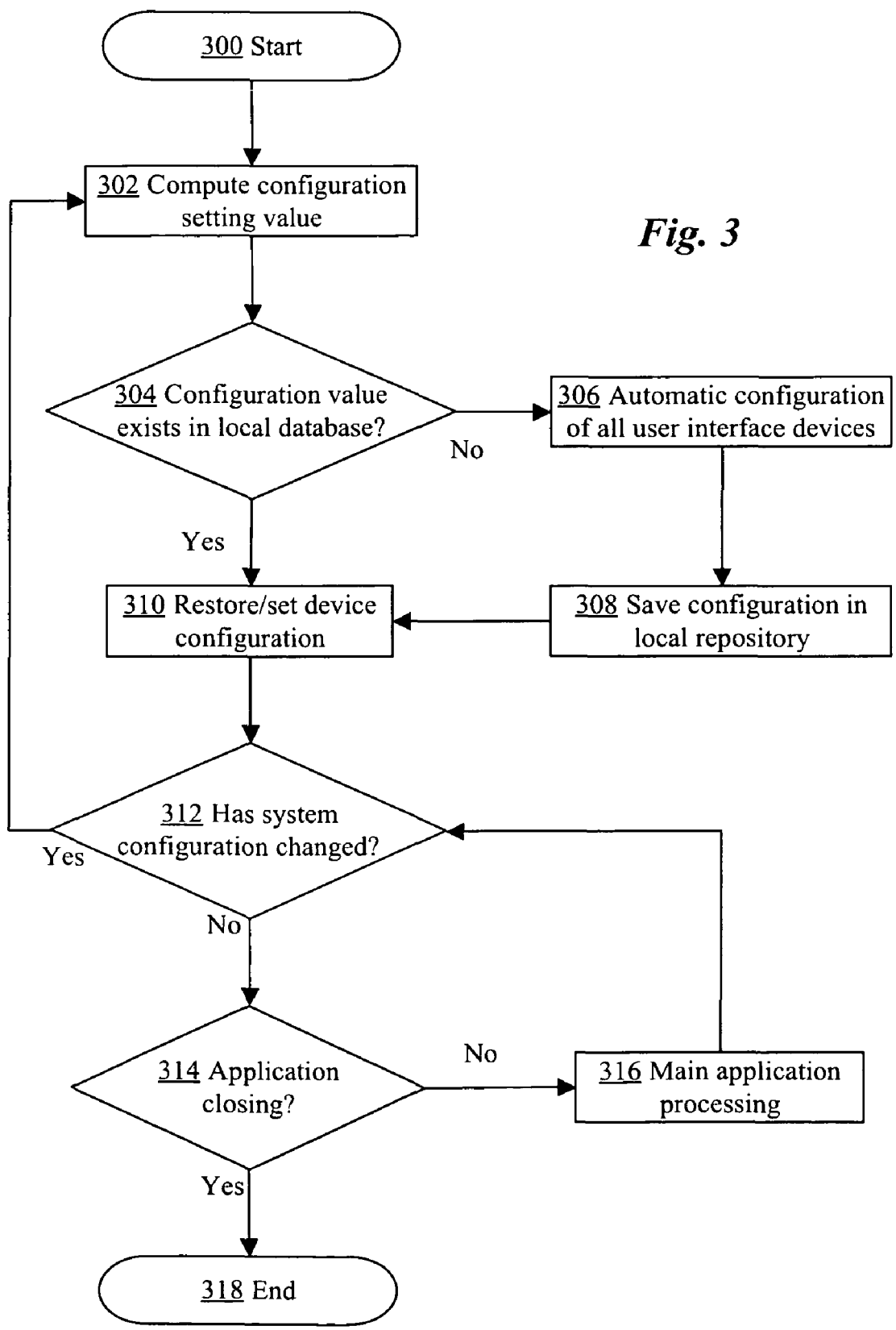
FIG. 3 is a flowchart illustrating details of an automatic user device configuration method adapted to a generic software application, according to an embodiment of the invention.

FIG. 3 is a flowchart illustrating details of an automatic user device configuration method adapted to a generic software application. After a start step 300, a unique system peripheral device configuration setting value is calculated in step 302 and then compared to configuration setting values in a local configuration settings repository in step 304. If there is no match, then an automatic configuration of peripheral devices is performed in step 306, and the configuration and associated configuration setting value is saved in the settings repository in step 308. At this point, the current configuration setting value matches a configuration setting value in the settings repository. In any case, the device configuration is then set/restored in step 310. A check whether the system peripheral device configuration has changed is performed in step 312. If there is a change, then control is returned to step 302 to repeat the device configuration steps as before. If not, then there is a check if the application is closing in step 314. If not, then control is passed to main software application processing in step 316 and subsequently back to check 312. If so, then the process terminates at 318.

Figure 4:
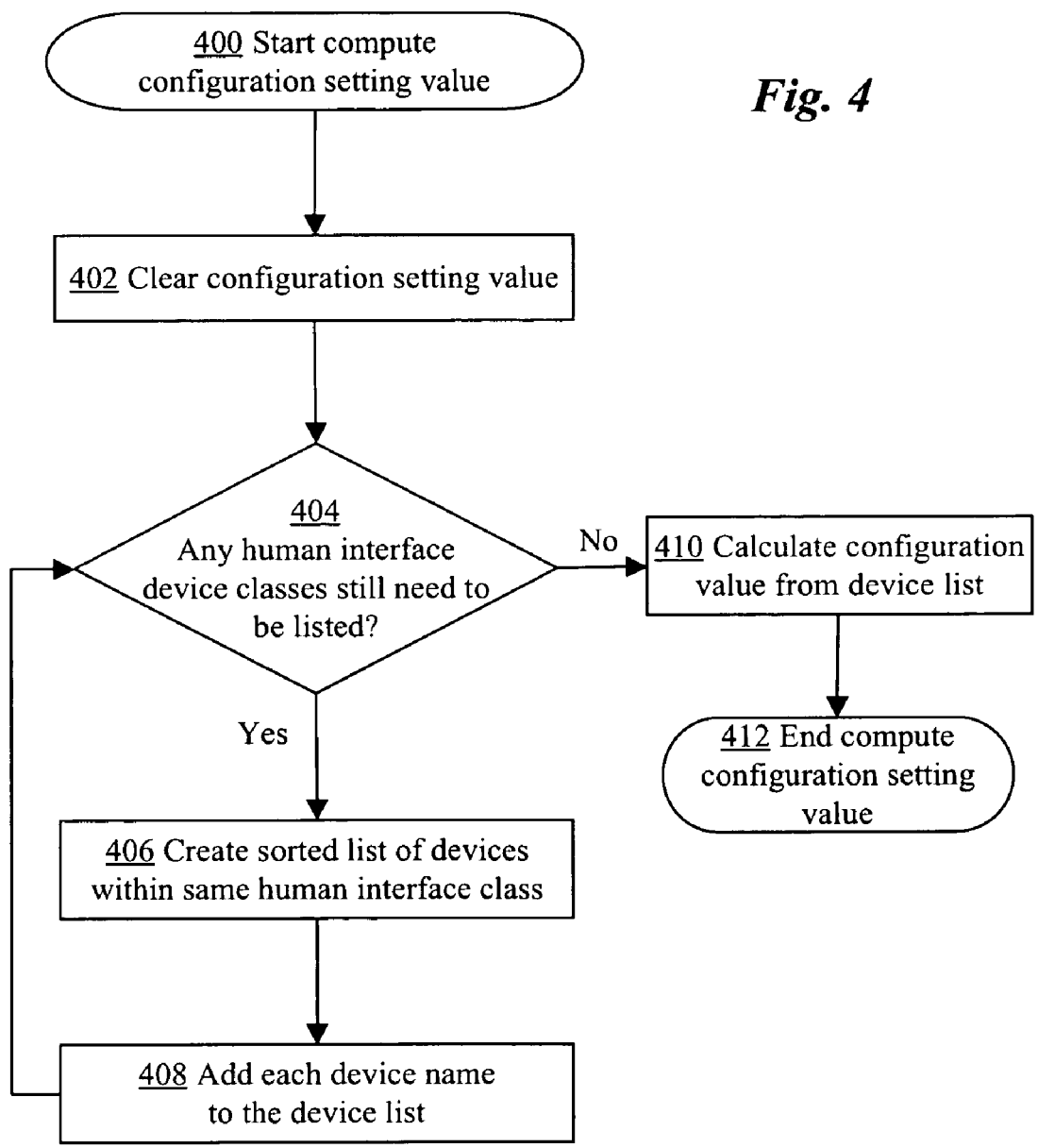
FIG. 4 is a flowchart illustrating details of the computation of a system device configuration setting value, according to an embodiment of the invention.

The computation of the unique system peripheral device configuration setting value in step 302 is shown in more detail in FIG. 4. After the procedure begins at step 400, the current device configuration setting value is cleared in step 402. In the context of an application where step 402 is performed using a hash function such as MD5, this step resets the hash to its initial state. In step 404 a check is made to see if any device class still remains to be listed. If so, the unlisted device class is identified and step 406 creates a sorted list of device names in the class. Step 408 then adds this sorted list to the system device list, and control then returns to step 404. If at step 404 no device class remains, then a configuration setting value is calculated from the system device list in step 410 and the computation of the system device configuration setting value terminates in step 412.

Figure 5:
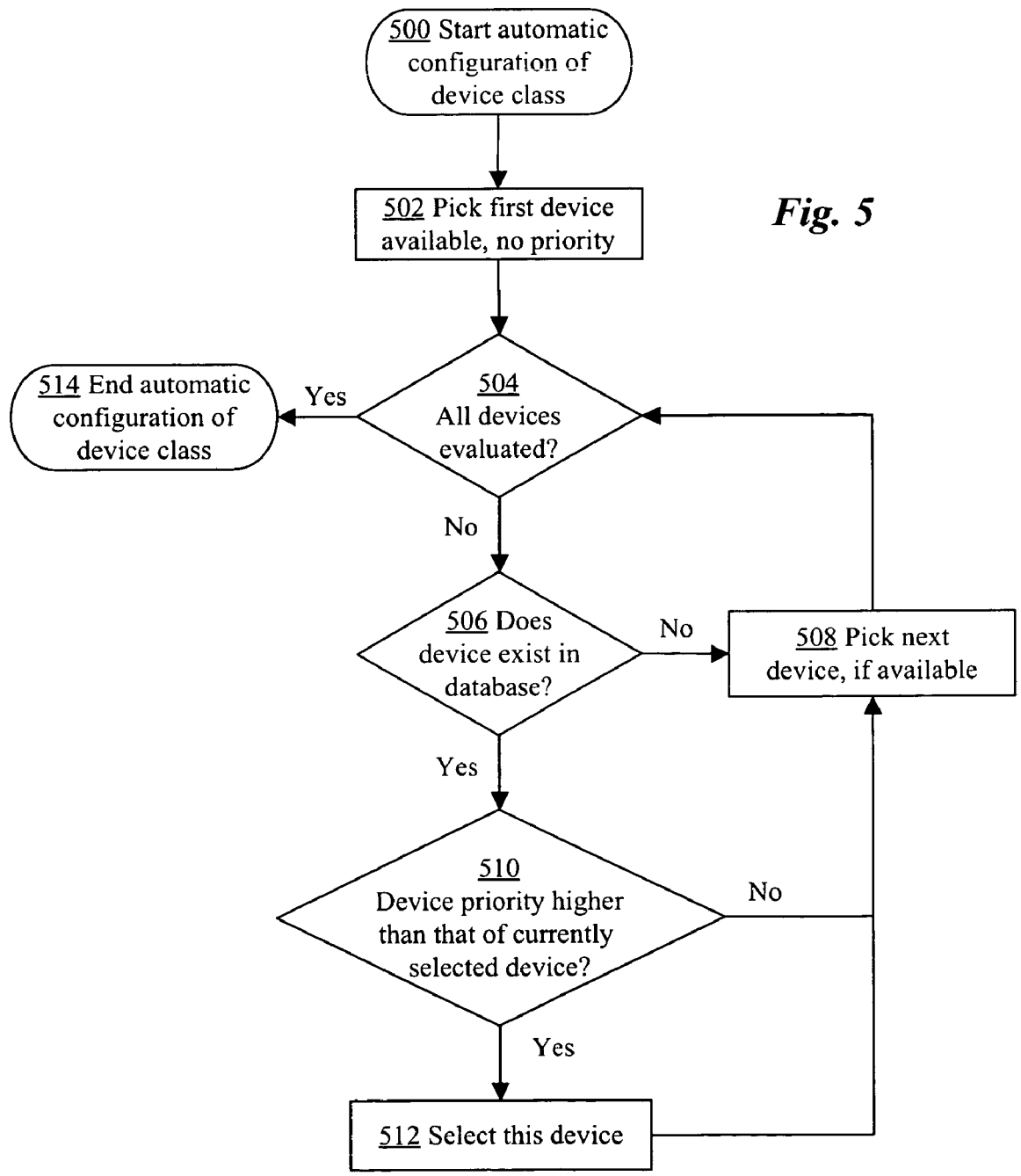
FIG. 5 is a flowchart illustrating details of the automatic configuration of a class of peripheral devices, according to an embodiment of the invention.

The automatic configuration of peripheral devices in step 306 of FIG. 3 is shown in more detail in the flowchart of FIG. 5. The flowchart shows the automatic configuration of devices in one device class and is repeated for all device classes appropriate for the current software application. After start step 500, a first device in the device class is picked for consideration and selected without regard for priority in step 502. Decision step 504 checks whether all devices in the device class have been considered. If so, the automatic configuration terminates in step 514 with the currently selected device. If not, decision step 506 checks if the currently picked device exists in the device database for the device class. If not, the next available device is picked for consideration in step 508, and control is returned to step 504. If so, decision step 510 checks if the currently picked device has a priority higher than that of the currently selected device. If not, then the next device is picked in step 508 and control is returned to step 504. If so, then the currently picked device is selected in step 512. The next device is then picked in step 508, and control is returned to step 504. This procedure is then repeated for all relevant device classes.

The invention claimed is:

1. A computer-implemented method for configuring peripheral devices used with voice and video over IP (VVoIP) software running on a computer, the method comprising:
    a) performing by the computer a device assessment resulting in a list of available peripheral devices currently connected to the computer, wherein the available peripheral devices are user input/output devices permitting a human user to interact with the computer using voice and video over IP (VVoIP) software;
    b) computing by the computer from the list of peripheral devices a configuration setting value that corresponds to a current selection of the available peripheral devices for use with voice and video over IP (VVoIP) software;
    c) when the computed configuration setting value exists in a settings repository, then automatically restoring by the computer a prior selection of the peripheral devices using a device selection in the settings repository corresponding to the computed configuration setting value;

d) when the computed configuration setting value does not exist in the settings repository, then automatically selecting by the computer selected devices from among the available peripheral devices in accordance with a predetermined devices database comprising possible devices and corresponding priority ranks for the possible devices, and saving by the computer the computed configuration setting value together with a current device selection in the settings repository;

wherein the settings repository comprises a list of prior configuration setting values and corresponding prior peripheral device selections for use with voice and video over IP (VVoIP) software.

2. The method of claim 1 wherein the software is a voice and video over IP (VVoIP) software.

3. The method of claim 1 wherein the peripheral devices comprise audio devices and video devices.

4. The method of claim 1 further comprising sorting the list of peripheral devices by device type and device name.

5. The method of claim 1 where the computed configuration setting value is determined by a hash algorithm.

6. The method of claim 5 wherein the hash value is computed using a hash routine selected from the group consisting of MD2, MD4, MD5, SHA1, SHA-256, SHA-512, RIPEMD-128/256, RIPEMD-160/320, and WHIRLPOOL.

7. The method of claim 1 wherein the device assessment is performed upon start-up of the software.

8. The method of claim 1 wherein the device assessment is performed while the software is running.

9. The method of claim 1 further comprising changing the current device selection in accordance with a manual user instruction, and saving the computed configuration setting value together with the current device selection in the settings repository.

10. The method of claim 1 wherein automatically configuring the available devices comprises selecting a headset device, a speaker-phone device, and a ring device.

11. The method of claim 1 wherein the devices database comprises a headset database, a speaker-phone database, and an exclusion database.

12. The method of claim 11 wherein the exclusion database comprises devices unsuitable for use with the software.

13. The method of claim 11 wherein the headset database comprises a list of devices suitable for use as a headset device, ordered by expected desirability of using the devices with the software.

14. The method of claim 11 wherein the speaker-phone database comprises a list of devices suitable for use as a speaker-phone device, ordered by expected desirability of using the devices with the software.

15. The method of claim 1 wherein the devices database is stored in a remote location.

16. The method of claim 1 wherein automatically selecting devices comprises prioritizing devices in accordance with user device preferences.

17. The method of claim 1 wherein automatically selecting devices comprises prioritizing devices in accordance with the software application.

18. The method of claim 1 further comprising disabling user selection of configurations associated with devices not currently available on the computer.

19. The method of claim 1 wherein the device assessment is performed automatically when a device connect-disconnect is detected.

\* \* \* \* \*